United States Patent [19]

Kaarstad

[11] Patent Number: 5,549,076
[45] Date of Patent: Aug. 27, 1996

[54] DEVICE FOR USE IN A REARING UNIT

[76] Inventor: Charles Kaarstad, Skolevn, 13A, N-9500, Alta, Norway

[21] Appl. No.: 211,442
[22] PCT Filed: Aug. 28, 1992
[86] PCT No.: PCT/NO92/00161
§ 371 Date: Oct. 31, 1994
§ 102(e) Date: Oct. 31, 1994
[87] PCT Pub. No.: WO93/06542
PCT Pub. Date: Sep. 21, 1992

[30] Foreign Application Priority Data

Oct. 8, 1991 [NO] Norway .................................. 913933

[51] Int. Cl.⁶ .................................................. A01K 63/02
[52] U.S. Cl. ............................................................ 119/223
[58] Field of Search .................................. 119/223, 208, 119/239, 238

[56] References Cited

U.S. PATENT DOCUMENTS

| 4,147,130 | 4/1979 | Goguel | 119/223 |
| 5,299,530 | 4/1994 | Mukadam et al. | 119/223 |

FOREIGN PATENT DOCUMENTS

| 2639511 | 6/1990 | France | 119/223 |
| 1066513 | 1/1984 | U.S.S.R. | 119/223 |
| 1489673 | 6/1989 | U.S.S.R. | 119/223 |

Primary Examiner—Todd E. Manahan
Attorney, Agent, or Firm—Dennison, Meserole, Pollack & Scheiner

[57] ABSTRACT

A rearing unit for use in a body of water includes a frame, a net bag held by the frame, a jumping fence mounted peripherally around the frame, a top net attached to the jumping fence to form, with the net bag, a closed unit, a floating ring supporting the closed unit and means for raising and lowering the closed unit with respect to the floating ring.

10 Claims, 6 Drawing Sheets

5,549,076

DEVICE FOR USE IN A REARING UNIT

BACKGROUND OF THE INVENTION

The present invention relates to fish rearing units, particulary a device according to the introductory part of patent.

Rearing fish in rearing units located in the ocean can be subject to undesirable changes in the environment, such as the flourishing of algae or jellyfish, and oil spillage. These occurances have shown to be an expensive problem for the rearing trade. So far fish farmers have in such cases had two options for preserving the value of the fish in the rearing plant:

1) slaughtering of the fish stock, 2) relocating the plant in a different area.

Both theses methods have been unsatisfactory for the fish farmer due to the large economic losses incurred. On the market today, there are closed PVC-rearing units where the water is pumped up from deeper layers. These units utilize the principle of transporting clean water up to the fish, and keep it separated from the environment, using a unit with a closed PVC-cloth.

There are also other known solutions where the rearing unit is lowered, with the floating ring/cage using air-filled, closed rooms in the floating ring. This is stated in NO patent publication 150,741, GB patent publication 2,008,912, DE patent publication 2.713.268, SE patent publication 458,088. Common to all these publications are the feature that both the rearing unit and floating ring should be lowered. The fish farmers thus cannot use existing investments in traditional rearing plants.

In order to hinder the spread of oil spillage, there exist oil bilges which suck up the oil, however, this is too expensive to have on each plant. The oil bilge does not suck up all surface oil. There will thus always be a thin film left on the sea surface, and this film is pollutive for fish Dumping at the surface. Furthermore, the effect of the oil bilge will be less if there are waves higher than 2–3 m.

SUMMARY OF THE INVENTION

There is a need for a device which can be a part of each rearing plant's preparedness for restricting losses due to flourishing of algae/jellyfish or oil spillage. This equipment demands two persons per rearing unit for assembling. The assembly can be done in 1–2 hours. This lowerable rearing unit equipment, in addition to the monitoring system which is located to monitor the flourishing of algae and oil spillage, may be saving a lot of plants from great losses due to damage from flourishing algae/jellyfish or oil spillage. So far, it has only been possible to alert fish farmers to the flourishing algae, without the fish farmer being able to take the necessary steps to save the fish.

By utilizing the present invention, fish farmers may use existing investments in the fish rearing plant, such as floating rings, rearing units and moorings. In addition, the fish farmer does not need to tow the plant away to other locations in the event of at flourishing algae/jellyfish or small oil spillages.

Another factor which means that the fish farmer will not be permitted to move these plants in the future is the great danger for spreading of sicknesses when plants are relocated from one area to another.

It is therefore an object of the present invention to provide device in rearing units for protecting the fish in the unit against local changes in the environment, without the disadvantages existing in known devices.

BRIEF DESCRIPTION OF THE DRAWINGS

The invention will now be described using an example of preferred embodiments, and with reference to the accompanying drawings, wherein FIGS. 5b, 5c and 5d shows details from the embodiment of FIG. 5a.

DESCRIPTION OF THE PREFERRED EMBODIMENTS

Figure 1:
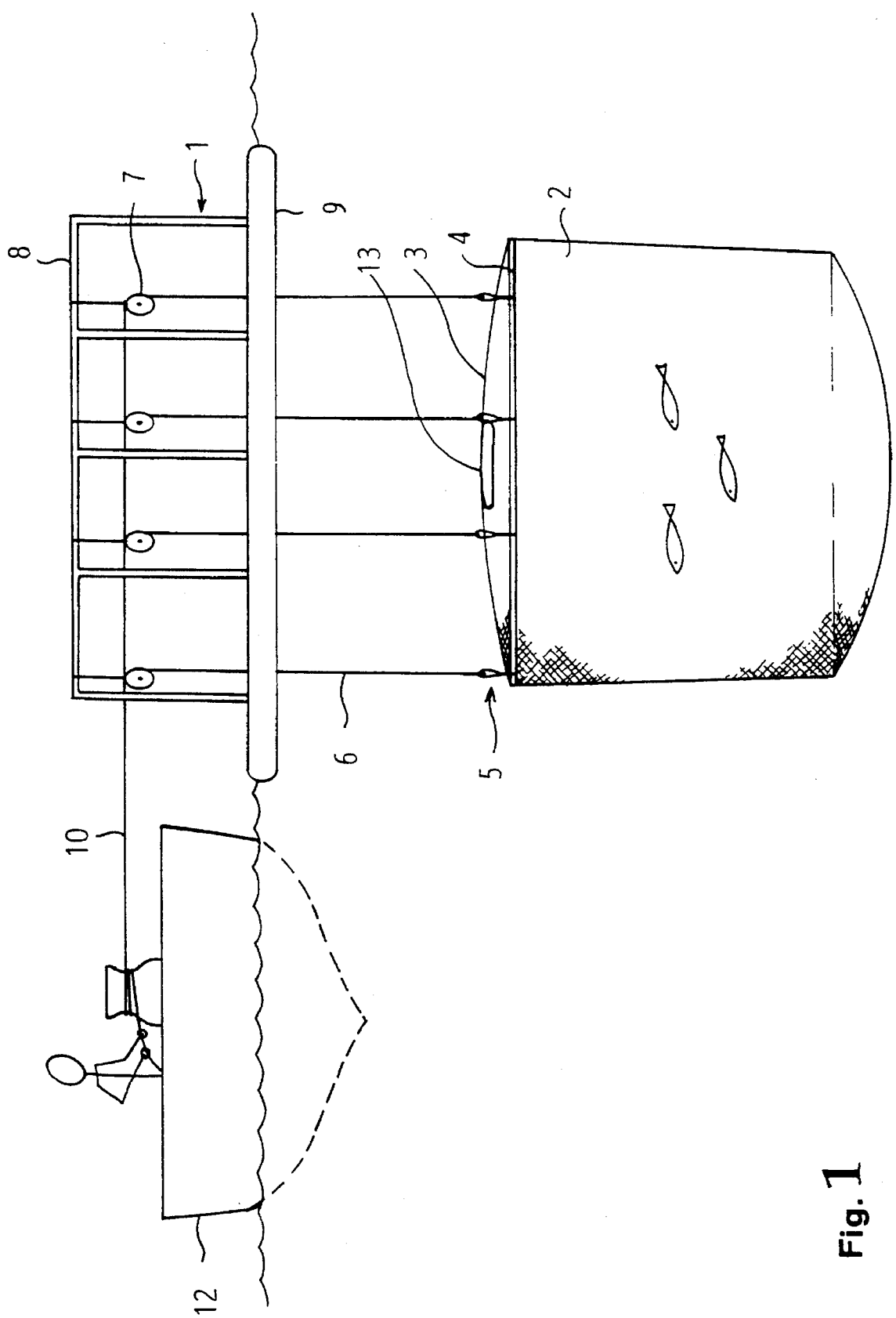
FIG. 1 illustrates a first embodiment according to present invention.

Referring first to FIG. 1, reference numeral 1 designates lowering/raising means according to present invention. To a rearing net bag 2 is fastened a top net 3 to the jumping fence of the rearing bag 2. The net bag and top net thus become a closed unit. The top net 3 should be of same kind of thread and openings as the rearing bag 2. This feature is for hindering the fish from escaping when the unit is lowered below sea level. The top net 3 and rearing unit 2 is stretched by a frame 4. The frame 4 has a circumference which is a bit smaller than the inner circumference of the floating ring 9. The frame should be made from a material such as wood, plastics or metal, which is stiff enough to keep the rearing unit stretched when the unit is lowered. In the center of the top net is mounted a floating body 13 which should hold the top net 3 up in the center of the rearing unit when it is lowered.

To the frame 4 is fastened a number of fastening points or nooses 5 connected to wires or ropes 6. The wires or the ropes 6 are guided over blocks 7 fastened to a hand rail or banisters 8 on floating ring 9. The ropes 6 pass to a windlass, winch, or similar device 11, which in the illustrated example is located in a boat 12. The number of fastening points and ropes which should be used will be a balance between e.g. the size of the rearing unit and how convenient it is to handle the ropes. To provide an even distribution of the raising force, there should be at least 4 ropes, but up to 12, preferably 8 ropes can be used.

When the environment is threatened, the rearing unit can be lowered to a depth which is free of algae, jellyfish or oil spillage, e.g. 20–25 m. When the ocean current has driven away algae/jallyfish/oil spillage, the rearing unit is raised directly up and into the floating ring 9.

Figure 2A:
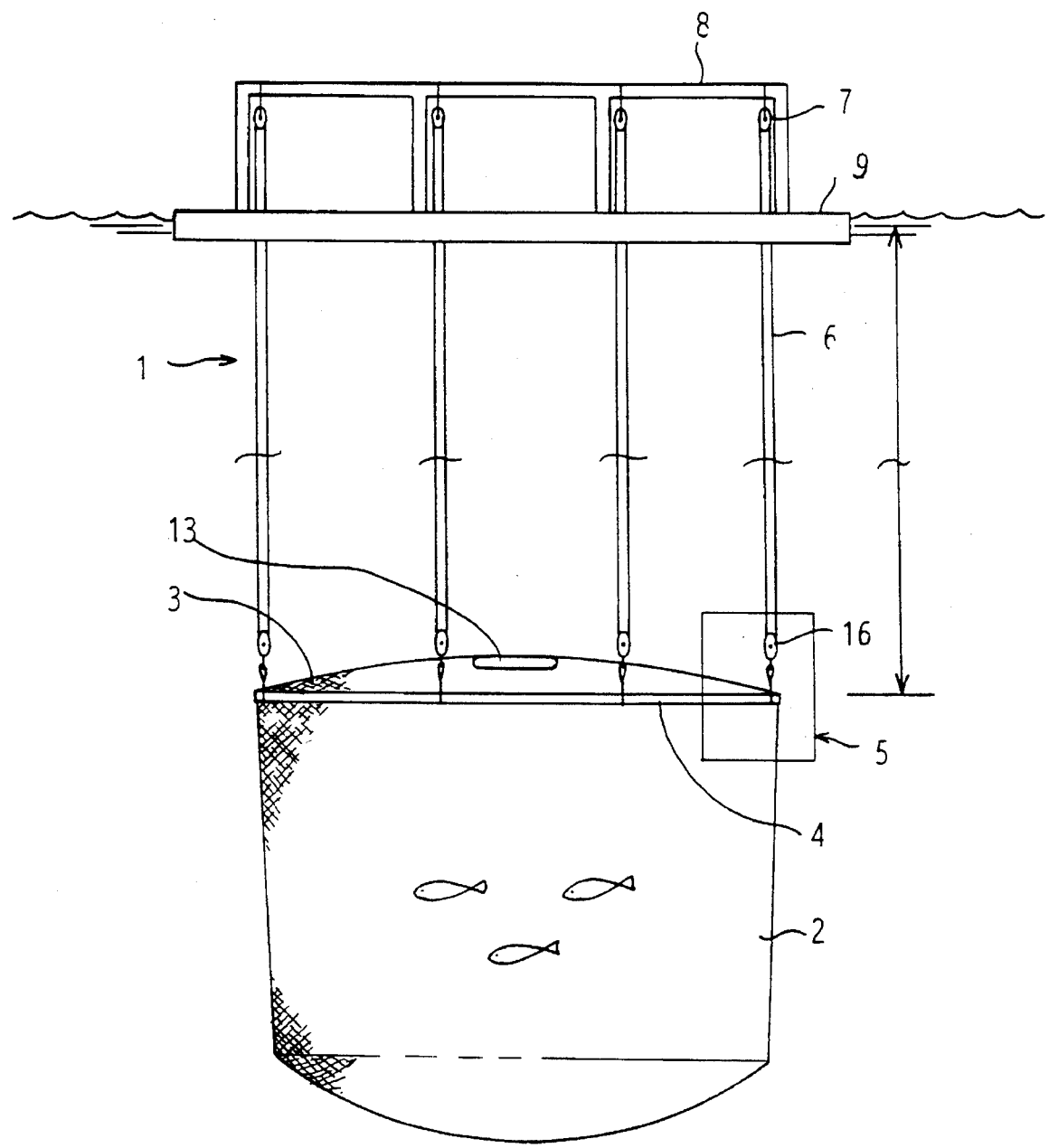
FIG. 2a illustrates a second embodiment according to present invention.

In principle there are two ways of lowering the rearing unit:

1) by means of single ropes and the blocks 7 as shown in FIG. 1, 2) by means of tackles 6, 7, 16 as shown in FIG. 2*a*.

In FIG. 1, the rearing unit is lowered by letting out ropes 6, each running through a respective block 7. When the rearing unit is to be raised each of the ropes 6 is taken through its respective block 7 to a windlass, a winch or similar device 11 in a boat 12. By using blocks 7 the ropes run easily and the windlass, the winch or similar device 11 will perform the heaviest part of the raising process.

Figure 2B:
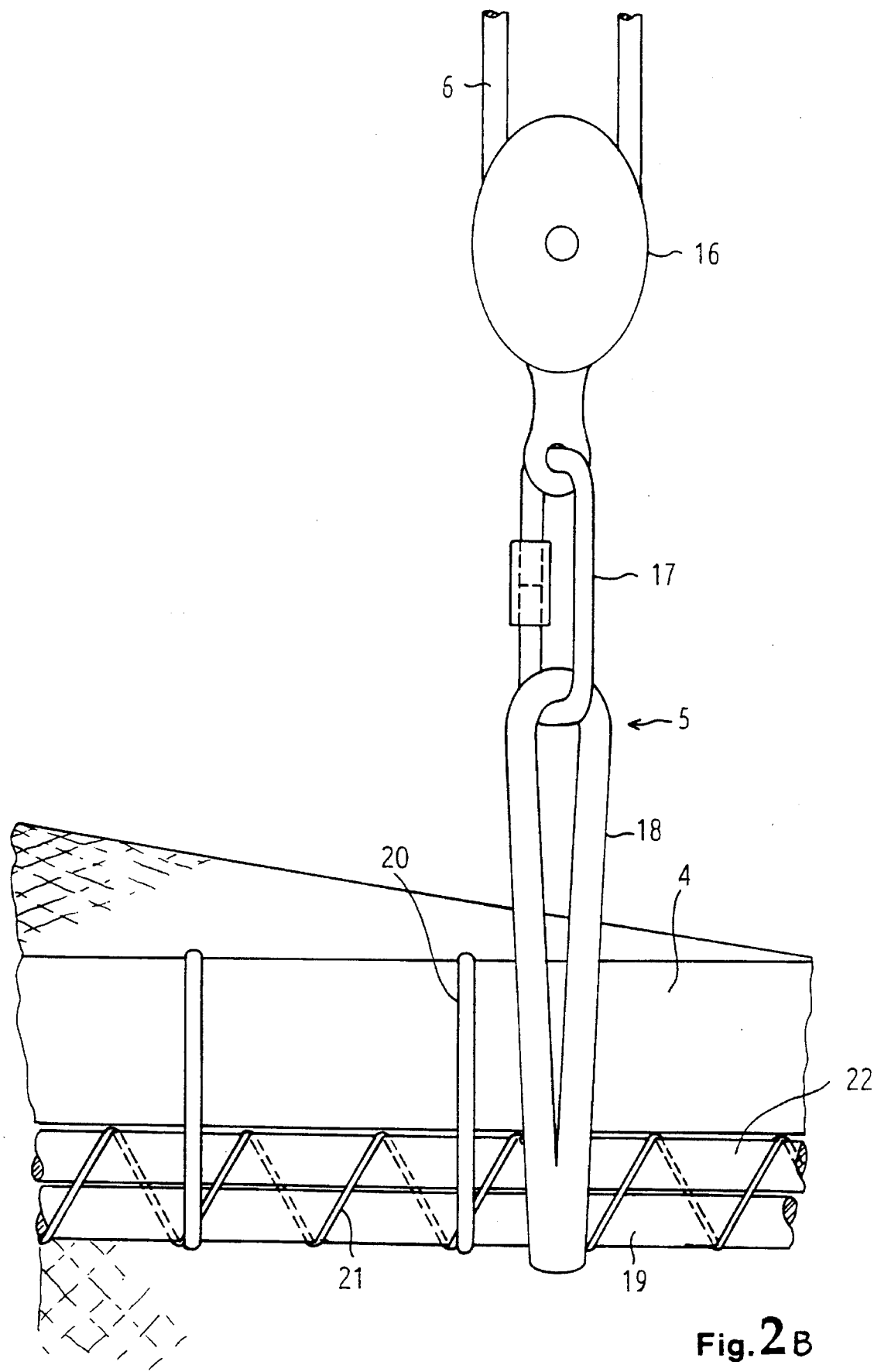
FIG. 2b illustrates a detail from the embodiment of FIG. 2a, FIG. 3a illustrates a first embodiment of a frame for stretching of the rearing unit and the top net, by a device according to present invention.

FIG. 2*a* shows a device according to present invention attached to a rearing unit lowered to the desired depth. Illustrated is a floating ring 9 with banisters 8 which carries the blocks 7 in the eight tackles. The ropes 6 extend to the blocks 16 of the rearing unit 2. This is shown in detail in FIG. 2*b*. A safety hook 17 is fastend to the block 16. The safety hook 17 is fastend to a carrier noose or loop 18 which again is fastend to the jumping fence of the rearing unit. A rope edging 22 in the top net 3 and a rope edging 19 in the jumping fence of the rearing unit 2 are sewed together by a lashing thread 21. Lashing ropes 20 fasten the frame 4 to the rearing unit and top net 3. These lashing ropes 20 should be set one for each running meter so that the frame 4 will have full effect in stretching the rearing unit and the top net when the rearing unit is lowered to the desired depth.

Figure 3A:
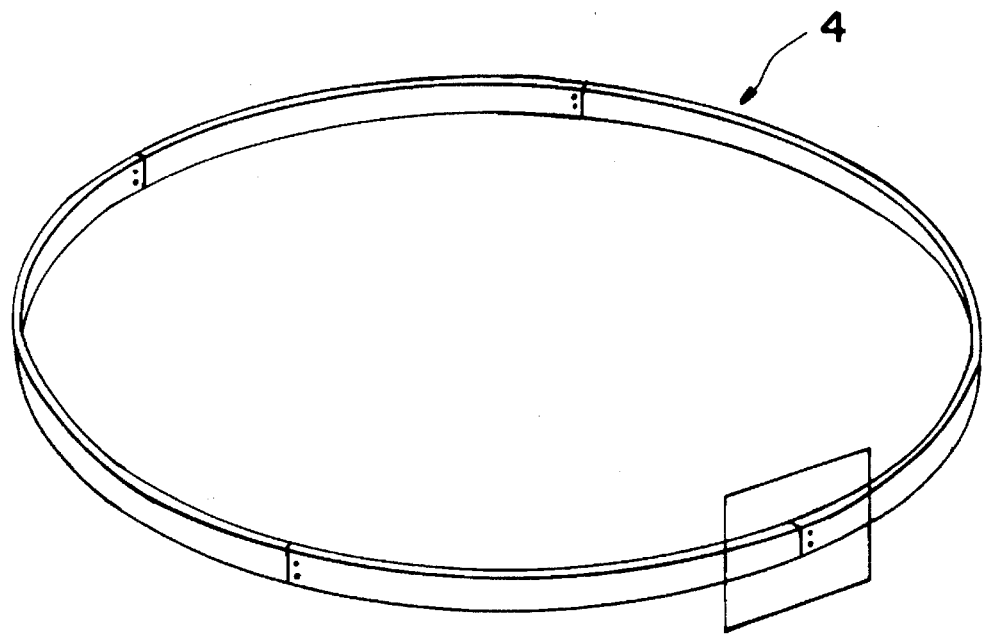
FIG. 3, 3b and 3c shows details from the embodiment of FIG. 3a, FIG. 4a illustrates a second embodiment of a frame for stretching a rearing unit and top net, by a device according to present invention.

FIG. 3–5 shows examples of different frames 4 for stretching the top net 3 and the net bag 2 in the lowered condition and usable with existing floating rings 9. The outer periphery of this frame 4 should be at bit smaller than the inner periphery of the floating ring 9 so that it can be possible to use existing equipment at the plant. This is because of it should be possible to raise the rearing unit up and into the floating ring 9 after the change in environment is over.

Figure 3B:
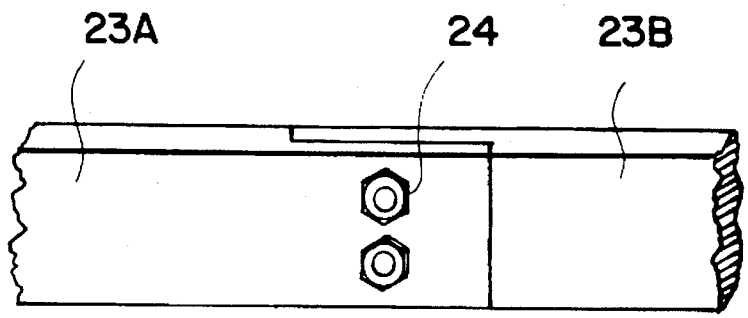
Figure 3C:
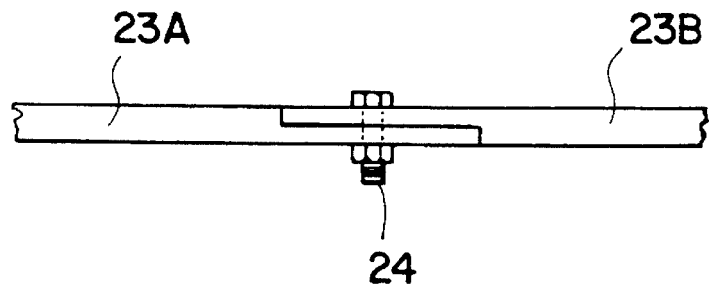

FIG. 3 shows a circular frame 4 of flat metal which is connected with two through-bolts 24 in each connection 23*a*, 23*b*. FIG. 3*b* and 3*c* illustrates how the flat metal is connected. This frame 4 can be made from plastic tubes, but it should be welded in the same way as with floating rings made from plastic, or connected with more sections using tube-bends.

Figure 4A:
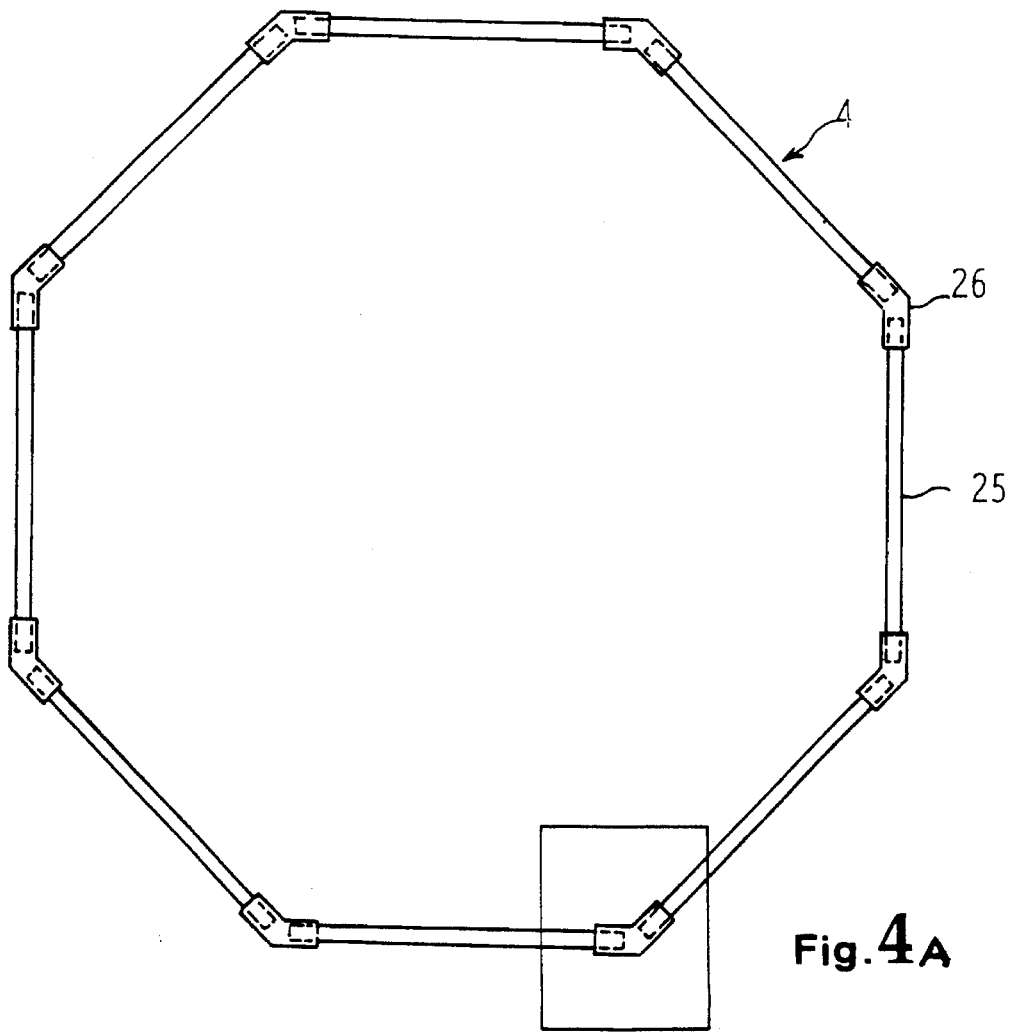
FIG. 4b shows a detail from the embodiment of FIG. 4a, FIG. 5a illustrates a third embodiment of a frame for stretching the rearing unit and a top net, by a device according to present invention.
Figure 4B:
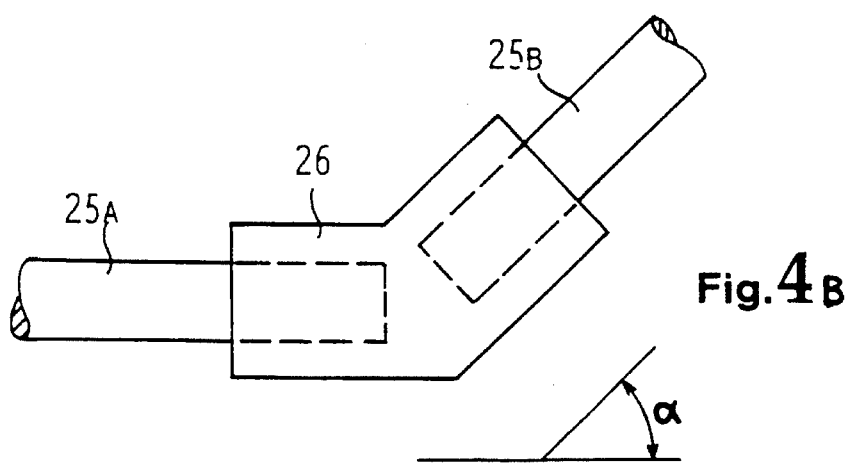

FIG. 4*a–b* shows an octogonal frame 4 which has the same shape as the so called Refa-rings. In this Figures frame 4 is assembled from plastic tubes and tube-bends 26 having an angle α of 45°.

Figure 5A:
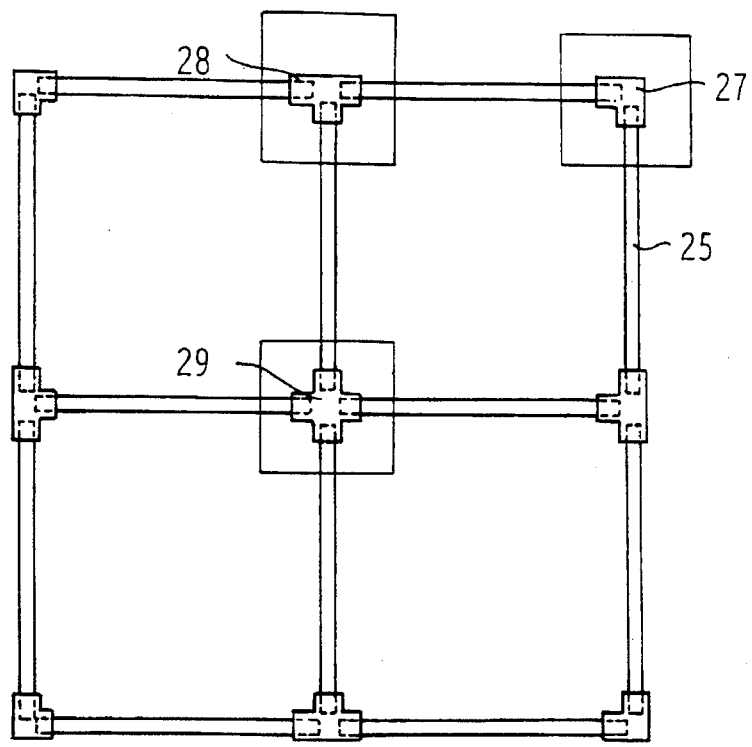
Figure 5B:
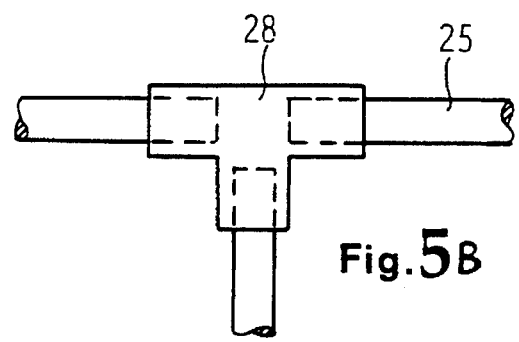
Figure 5D:
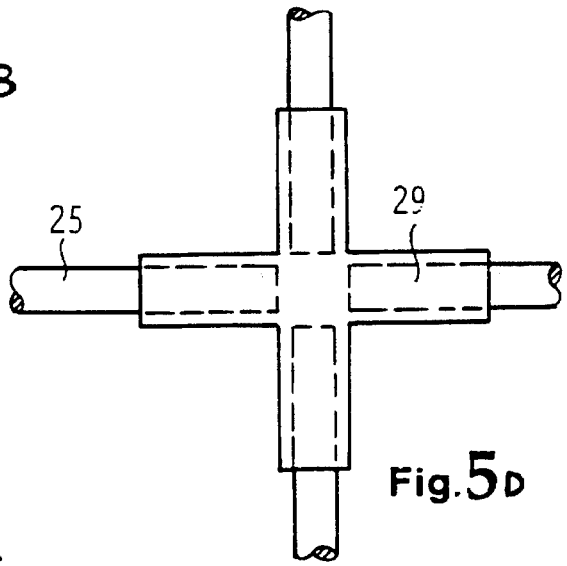
Figure 5C:
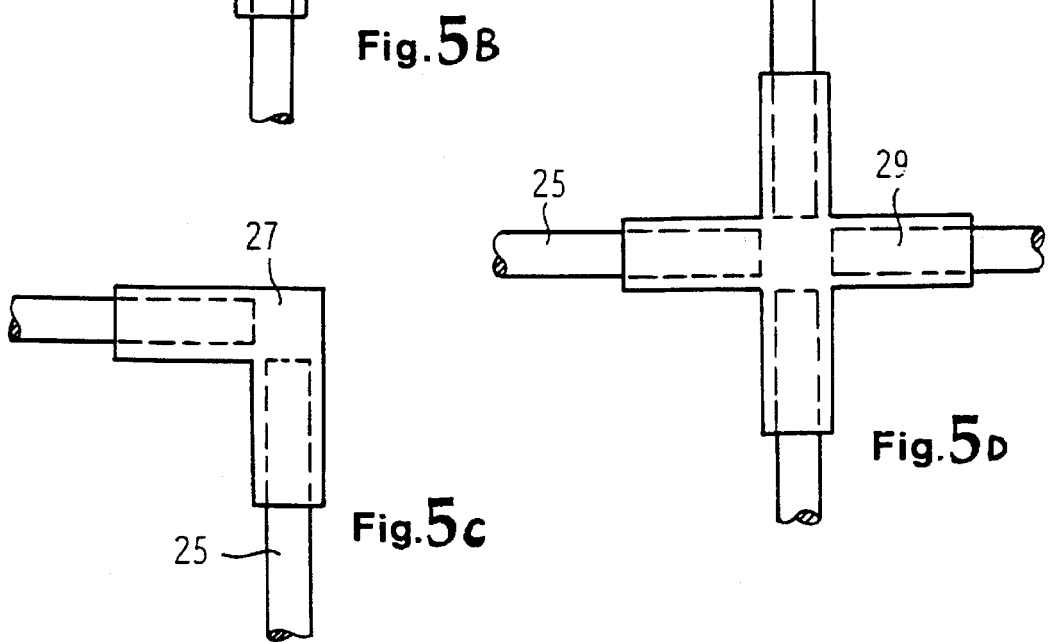

FIG. 5*a–d* shows how this is adapted to square floating rings 9. In this embodiment, the frame 4 is made more rigid, using inner bracing to prevent it from collapsing in the lowered condition. FIG. 5*b*, 5*c* and 5*d* shows how the frame 4 is assembled using tube-bends 27, 28, 29 of three different kinds, namely: four T-bends 28, four 90° bends 27 and one bend 29 having four outlets, each outlet being perpendicular to the other. This embodiment uses plastic tubes and accompanying tube bends.

The assembly of the algae, jellyfish and oil defence is commenced on shore, where frame 4 is assembled. This work may be done by one person, while two other persons are commence fastening of the floating body 13 in the center of the top net 3 before sewing of the top net 3 to the jumping fence of the rearing unit. To get the rope edging 22 of the top net 3 sewn tightly to the rope edging of the jumping fence 19, the two persons should commence sewing out from the same point around the ring, until they meet on the opposite side. Thereafter the tackles are fastend to the handrail 8 of the floating ring 9 and the carrier nooses 18 of the jumping fence to the tackles. Next step is to fasten the frame 4 to the rope edging 19, 22 of the top net and the jumping fence. The rearing unit can then be loosened from the floating ring 9 and slowly lowered to the desired depth. When the rearing unit is to be raised, at least four persons in each unit should be present to handle the tackles.

If using the method shown in FIG. 1, two persons are sufficient to raise the unit up and into the floating ring. One person will handle all the raising ropes, while the other person stands on the ring ready to fasten the rearing unit when this is raised and positioned into the floating ring.

It is also possible to use clips, hooks etc. to fasten the top net quickly to the jumping fence. This, however, has the disadvantage that it presents a danger of wear of the rearing unit and resultant escape of the fish.

What is claimed is:

1. Rearing unit for use in a body of water, comprising:
   a) a frame;
   b) a net bag held by the frame;
   c) a jumping fence mounted peripherally around the frame;
   d) a top net attached to the jumping fence to form, with the net bag, a closed unit;
   e) a floating ring supporting the closed unit, said closed unit being separable from the floating ring;
   f) means for raising and lowering the closed unit with respect to the floating ring comprising a plurality of ropes fastened to the net bag, a bannister attached to the floating ring, upper blocks attached to the bannister with the ropes extending through the upper blocks, and take-up means for the ropes located externally of the closed unit and floating ring, said net bag being stretched when said closed unit is lowered.

2. Rearing unit according to claim 1, wherein the ropes are fastened to the net bag through lower blocks.

3. Rearing unit according to claim 2, wherein there are between four and twelve of said ropes fastened to the net bag, said lower blocks and said upper blocks.

4. Rearing unit according to claim 2, wherein the lower blocks are connected to the net bag through a safety hook, a carrier noose or both a safety hook and a carrier noose.

5. Rearing unit according to claim 1, wherein said take-up means comprises a windlass or power block fastened to the ropes at an end opposite the net bag.

6. Rearing unit according to claim 1, wherein the frame has the shape of a ring, a quadrilateral, or an octagon, and is made from plastic, metal or wood.

7. Rearing unit according to claim 6, wherein the frame comprises plastic tubes connected using one or more of the means angle links, T-links and cross links.

8. Rearing unit according to claim 6, wherein the frame comprises a band of plastic or metal which is formed from lengths of plastic or metal connected using nuts and bolts.

9. Rearing unit according to claim 6, additionally comprising a floating body located within the closed unit and positioned centrally adjacent the top net.

10. Rearing unit according to claim 1, wherein the top net is sewn to the jumping fence.

\* \* \* \* \*